(12) United States Patent
Lota et al.

(10) Patent No.: US 8,172,293 B2
(45) Date of Patent: May 8, 2012

(54) VEHICLE ELECTRONIC DEVICE SUPPORT SYSTEMS

(75) Inventors: Charan Singh Lota, Canton, MI (US); Que-Whang Rhee, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 321 days.

(21) Appl. No.: 11/971,414

(22) Filed: Jan. 9, 2008

(65) Prior Publication Data
US 2009/0174209 A1    Jul. 9, 2009

(51) Int. Cl.
  *B60R 11/00* (2006.01)
(52) U.S. Cl. .............. 296/24.34; 296/37.8; 296/37.12; 224/483
(58) Field of Classification Search .......... 296/37.8, 296/24.34, 37.14, 37.12, 70, 37.1; 224/483, 224/540, 539; *B60R 27/00, 11/00*
See application file for complete search history.

(56) References Cited

U.S. PATENT DOCUMENTS

| | | | |
|---|---|---|---|
| 3,465,614 A | 9/1969 | Reynolds | |
| 4,680,928 A | 7/1987 | Nishikawa et al. | |
| 4,838,126 A | 6/1989 | Wilfinger et al. | |
| 4,876,923 A | 10/1989 | Crandall et al. | |
| 5,275,069 A | 1/1994 | Baba et al. | |
| 5,310,033 A | 5/1994 | Shibayama | |
| 5,466,036 A | 11/1995 | Stroeters et al. | |
| 5,743,010 A | 4/1998 | Zaguskin et al. | |
| 5,996,866 A * | 12/1999 | Susko et al. | 224/281 |
| 6,086,129 A * | 7/2000 | Gray | 296/37.8 |
| 6,203,088 B1 | 3/2001 | Fernandez | |
| 6,354,651 B1 | 3/2002 | Mori | |
| 6,419,059 B1 | 7/2002 | Nobu et al. | |
| 6,419,314 B1 | 7/2002 | Scheerhorn | |
| 6,446,305 B1 * | 9/2002 | Kneeland | 16/82 |
| 6,478,204 B2 | 11/2002 | Lange | |
| 6,499,785 B2 | 12/2002 | Eguchi | |
| 6,616,206 B2 | 9/2003 | Luginbill | |
| 6,666,492 B1 | 12/2003 | Schmidt et al. | |
| 6,702,352 B2 | 3/2004 | Nakanishi | |
| 6,709,041 B1 * | 3/2004 | Hotary et al. | 296/70 |
| 6,719,343 B2 | 4/2004 | Emerling | |
| 6,719,344 B2 | 4/2004 | Ono | |
| 6,726,267 B2 | 4/2004 | Kim | |
| 6,761,388 B2 | 7/2004 | Lein | |
| 6,788,528 B2 | 9/2004 | Enners et al. | |
| 6,796,591 B2 | 9/2004 | Yanagita | |
| 6,851,636 B2 | 2/2005 | Klopp, III | |
| D502,910 S | 3/2005 | Klopp | |
| 6,942,267 B1 | 9/2005 | Sturt | |
| D513,938 S | 1/2006 | Griffin | |
| D522,957 S | 6/2006 | Miyashita | |
| 7,066,436 B2 | 6/2006 | Honda | |
| 7,175,217 B1 * | 2/2007 | Lota | 296/24.34 |

(Continued)

*Primary Examiner* — Glenn Dayoan
*Assistant Examiner* — Sunsurraye Westbrook
(74) *Attorney, Agent, or Firm* — Dinsmore & Shohl LLP

(57) ABSTRACT

Embodiments of a vehicle electronic device support system comprise a vehicle console and an electronic device holder disposed anterior to the vehicle console, wherein the vehicle console comprises a vehicle console bin comprising an auxiliary port, and the electronic device holder is configured to secure an electronic device. The electronic device holder comprises an opening at the bottom of the electronic device holder which extends into the vehicle console bin, which is configured to pass a cord of an electronic device through the opening of the electronic device holder into the vehicle console bin for connection with the auxiliary port.

18 Claims, 6 Drawing Sheets

U.S. PATENT DOCUMENTS

| | | |
|---|---|---|
| 7,192,070 B2 | 3/2007 | Radu |
| 7,269,002 B1 | 9/2007 | Turner et al. |
| 7,270,359 B2 | 9/2007 | Sparks et al. |
| 7,341,297 B2 | 3/2008 | Nakamura |
| 7,413,229 B2 * | 8/2008 | Kukucka et al. ............ 296/24.34 |
| 7,469,951 B2 * | 12/2008 | Welschholz et al. ......... 296/37.8 |
| 7,566,040 B2 | 7/2009 | Lota |
| 2002/0005424 A1 | 1/2002 | Lange |
| 2002/0135194 A1 * | 9/2002 | Schwarz ...................... 296/37.8 |
| 2003/0064748 A1 | 4/2003 | Stulberger |
| 2003/0155786 A1 | 8/2003 | Kim |
| 2005/0014536 A1 | 1/2005 | Grady |
| 2005/0147951 A1 | 7/2005 | Rohrbach |
| 2005/0211523 A1 | 9/2005 | Takahashi |
| 2005/0248169 A1 | 11/2005 | Clark |
| 2006/0052144 A1 | 3/2006 | Seil et al. |
| 2006/0058073 A1 | 3/2006 | Kim |
| 2006/0071497 A1 | 4/2006 | Radu |
| 2006/0277555 A1 | 12/2006 | Howard et al. |
| 2007/0090241 A1 | 4/2007 | Risse |
| 2007/0102945 A1 | 5/2007 | Mulvihill |
| 2007/0114974 A1 | 5/2007 | Grady |
| 2007/0170332 A1 | 7/2007 | Akerstedt et al. |
| 2007/0176449 A1 | 8/2007 | Kukucka et al. |
| 2007/0182187 A1 * | 8/2007 | Lota .............................. 296/37.8 |
| 2007/0205622 A1 | 9/2007 | Whitens |

* cited by examiner

VEHICLE ELECTRONIC DEVICE SUPPORT SYSTEMS

TECHNICAL FIELD

Embodiments of the present invention are generally directed to ergonomic vehicle electronic device support systems configured to maximize the space and aesthetic appeal of the vehicle console.

BACKGROUND

Use of electronic devices, such as cellular phones and handheld electronic music devices (e.g. MP3 players and iPods®), have become increasingly prevalent in vehicles. In conjunction with this increased use, integrating these electronic devices into automobiles is desirable. Some vehicles offer iPod holders integrated into the armrest; however, this location forces drivers to twist their torso in order to push buttons on the device or view the display. Additionally, drivers lose the armrest for driving comfort. Other vehicles use electronic device holders in one of the cupholders; however, this also requires the twisting of the torso when operating the device, and further causes a driver to lose at least one cup position.

In addition to the ergonomic and spacing issues, integrating electronic devices into a vehicle may affect the styling and appearance of the vehicle interior. For example, the cords of these electronic devices may block access to other internal components of the vehicle as well as diminish the appearance of the vehicle interior. Accordingly, there is a need for ergonomic electronic device systems configured to support electronic devices in an ergonomic and aesthetically pleasing location, while maximizing the space and utility of the vehicle console.

SUMMARY

In accordance with one embodiment, a vehicle electronic device support system is provided. The vehicle electronic device support system comprises a vehicle console, and an electronic device holder disposed anterior to the vehicle console. The electronic device holder comprises a support cavity disposed at a lower portion of the electronic device holder, wherein the support cavity comprises a retractable mechanism configured to deflect at least partially horizontally upon insertion of an electronic device. The retractable mechanism is configured to secure a bottom section of the electronic device inside the cavity. The moveable door is configured to cover the support cavity while in a closed position, and is further configured to allow insertion of an electronic device into the support cavity while in an open position.

In accordance with another embodiment, a vehicle electronic device support system comprising a vehicle console and an electronic device holder disposed anterior to the vehicle console is provided. The vehicle console comprises a vehicle console bin having an auxiliary port, and the electronic device holder comprises an opening at the bottom of the electronic device holder in communication with the vehicle console bin. The vehicle electronic device support system is configured to pass a cord of an electronic device through the opening of the electronic device holder into the vehicle console bin for connection with the auxiliary port.

In accordance with yet another embodiment, the vehicle electronic device support system comprises a vehicle console and an electronic device holder disposed anterior to the vehicle console. The vehicle console comprises a vehicle console bin having an auxiliary port, and the electronic device holder comprises a support cavity disposed at a lower portion of the electronic device holder. The support cavity comprises a retractable mechanism configured to deflect at least partially horizontally upon insertion of an electronic device. The retractable mechanism being configured to secure a bottom section of the electronic device inside the cavity. The electronic device holder comprises a moveable door configured to cover the support cavity while in a closed position, and is further configured to allow insertion of an electronic device into the support cavity while in an open position. The electronic device holder also comprises an opening at the bottom of the electronic device holder which extends into the vehicle console bin, wherein the vehicle electronic device support system is configured to pass a cord of an electronic device through the opening of the electronic device holder into the vehicle console bin for connection with the auxiliary port.

These and additional objects and advantages provided by the embodiments of the present invention will be more fully understood in view of the following detailed description, in conjunction with the drawings.

BRIEF DESCRIPTION OF THE DRAWINGS

The following detailed description of specific embodiments of the present invention can be best understood when read in conjunction with the drawings enclosed herewith. The drawing sheets include.

Figure 1:
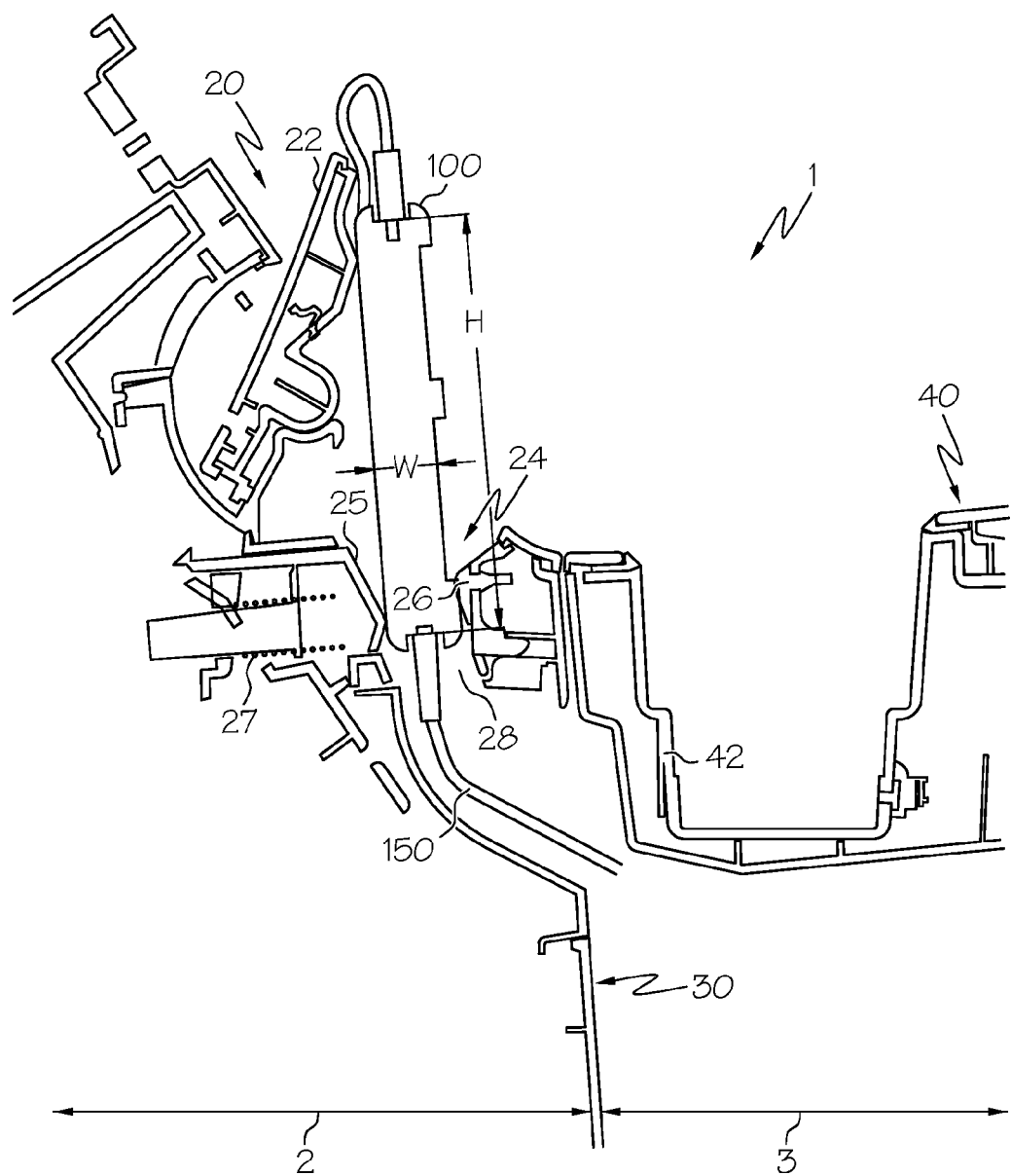
FIG. 1 is a side cross-sectional view of a vehicle electronic device support system comprising an electronic device holder according to one or more embodiments of the present invention.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION

Embodiments of the present invention are directed to vehicle electronic device support systems comprising electronic device holders positioned anteriorly to the vehicle console. As used herein, the "vehicle console" refers to the central panel disposed between the driver seat and the passenger seat, which may or may not extend up to the dashboard of the vehicle. The electronic device holders are configured to support electronic devices in an ergonomic location such as on the dashboard of a vehicle, and are further configured to rout a cord of an electronic device internally within the vehicle console, so that the styling, appearance and security of the vehicle console (or the vehicle itself) is not negatively impacted by loose, visible cords.

Figure 4A:
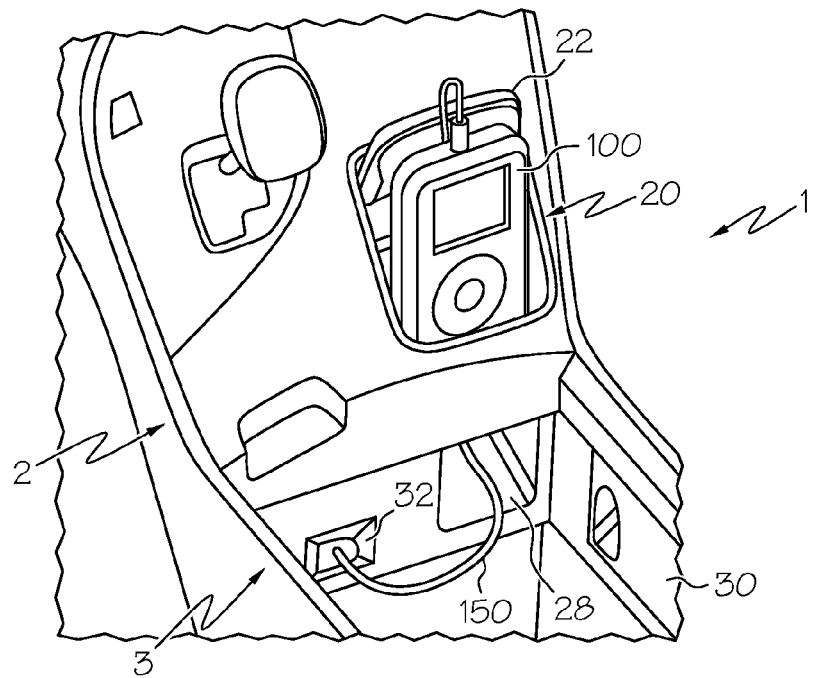
FIG. 4A is a front view of the vehicle electronic support system illustrating how a cord of an electronic device is routed from the electronic device holder to the auxiliary port of the vehicle console bin according to one or more embodiments of the present invention.
Figure 4B:
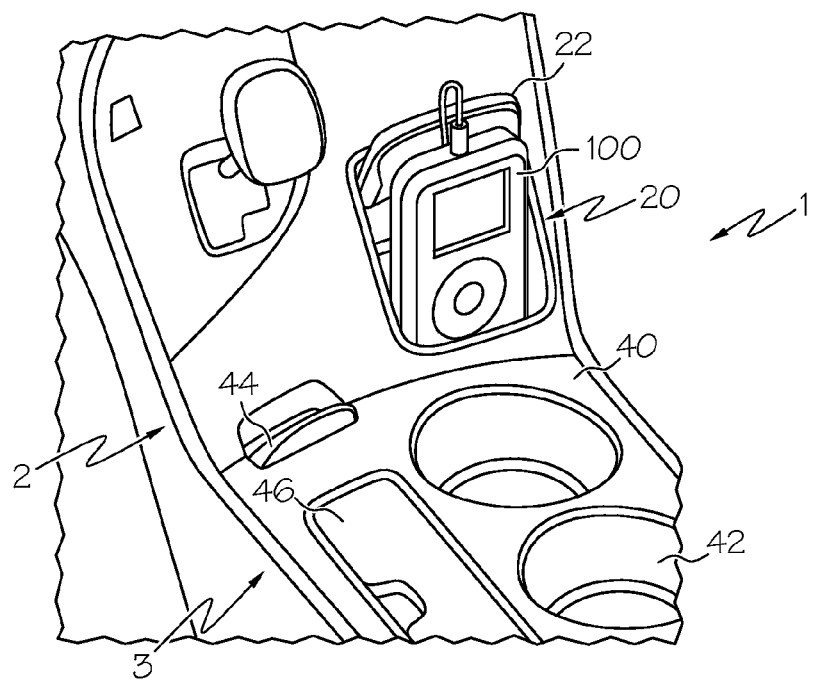
FIG. 4B is a front view of the vehicle electronic support system of FIG. 4A with the upper panel disposed over the vehicle console bin and thereby hiding the routed cord according to one or more embodiments of the present invention.

Referring to the embodiments of FIGS. 1 and 4A-4B, the vehicle electronic device support system 1 comprises an electronic device holder 20 disposed anterior to the vehicle console 3. As shown in FIG. 1, electronic device holder 20 may be on the dashboard 2, which is anterior to the vehicle console 3. The electronic device holder 20 is configured to support handheld electronic devices (e.g., cell phones, PDAs, and electronic music devices, for example, MP3 players like Microsoft's Zune® or Apple's iPod®). By placing the electronic device holder 20 inside the dashboard 2, an electronic device 100 is placed in a forward position relative to the vehicle console, so that drivers are not forced to twist their torso in order to push buttons on the electronic device 100 to view the display of the electronic device 100.

Figure 2:
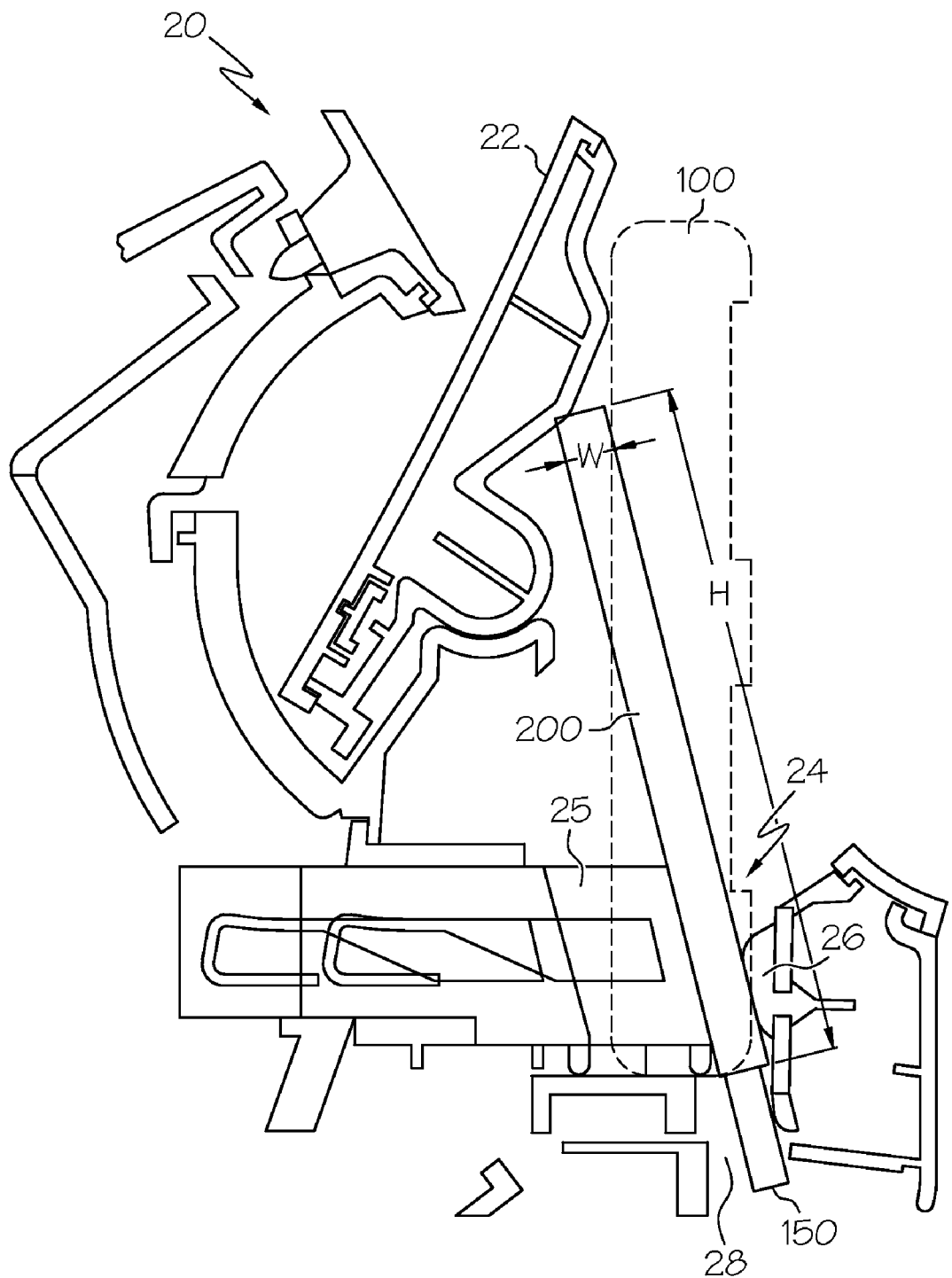
FIG. 2 is a side cross-sectional view of an electronic device holder according to one or more embodiments of the present invention.

Referring to FIGS. 1 and 2, the electronic device holder 20 comprises a support cavity 24 disposed at a lower portion of the electronic device holder 20. The support cavity 24 may comprise a retractable mechanism 25 configured to deflect horizontally upon insertion of an electronic device 100. The retractable mechanism 25 may be configured to secure a bottom section of the electronic device 100 inside the support cavity 24. The retractable mechanism 25 enables the support cavity 24 to accommodate electronic devices 100 of various widths. As shown in FIG. 1, the retractable mechanism 25 may comprise a variety of suitable components, for example, a spring loaded bar or rod 27. The support cavity 24 may also comprise a bumper 26 disposed within the support cavity 24. As shown in FIG. 2, the bumper 26 is disposed diametrically opposite the retractable mechanism 25, so that an electronic device 200 is contacted on one face by the bumper 26, and is contacted on an opposite face by the retractable mechanism 25 of the support cavity 24. Like the retractable mechanism 25, many components are contemplated for use in the bumper assembly 26. For example, the bumper 26 may be spring biased like the retractable mechanism 25. In addition, the bumper 26 may further comprise components that facilitate rotational movement, lateral movement, up/down motion, or combinations thereof. Moreover, the bumper 26 may comprise a rubber stop or another surface component, which will limit movement of the electronic device 100 by providing surface friction.

In operation or use, the insertion of the electronic device 100 into the cavity 24 acts to compress the spring 27, and reciprocally, the spring 27 provides a force on the bottom section of the electronic device 100, thereby securing the electronic device inside the cavity 24. In addition to these forces provided by the spring 27 and the bumper 26, the moveable door 22 also provides a force on the upper section of the electronic device 100 to secure the electronic device 100. By securing the electronic device 100, the retractable mechanism 25 prevents rattling of the electronic device 100 while driving, and also steadies the electronic device 100 during hard accelerations or sharp turns.

Figure 3A:
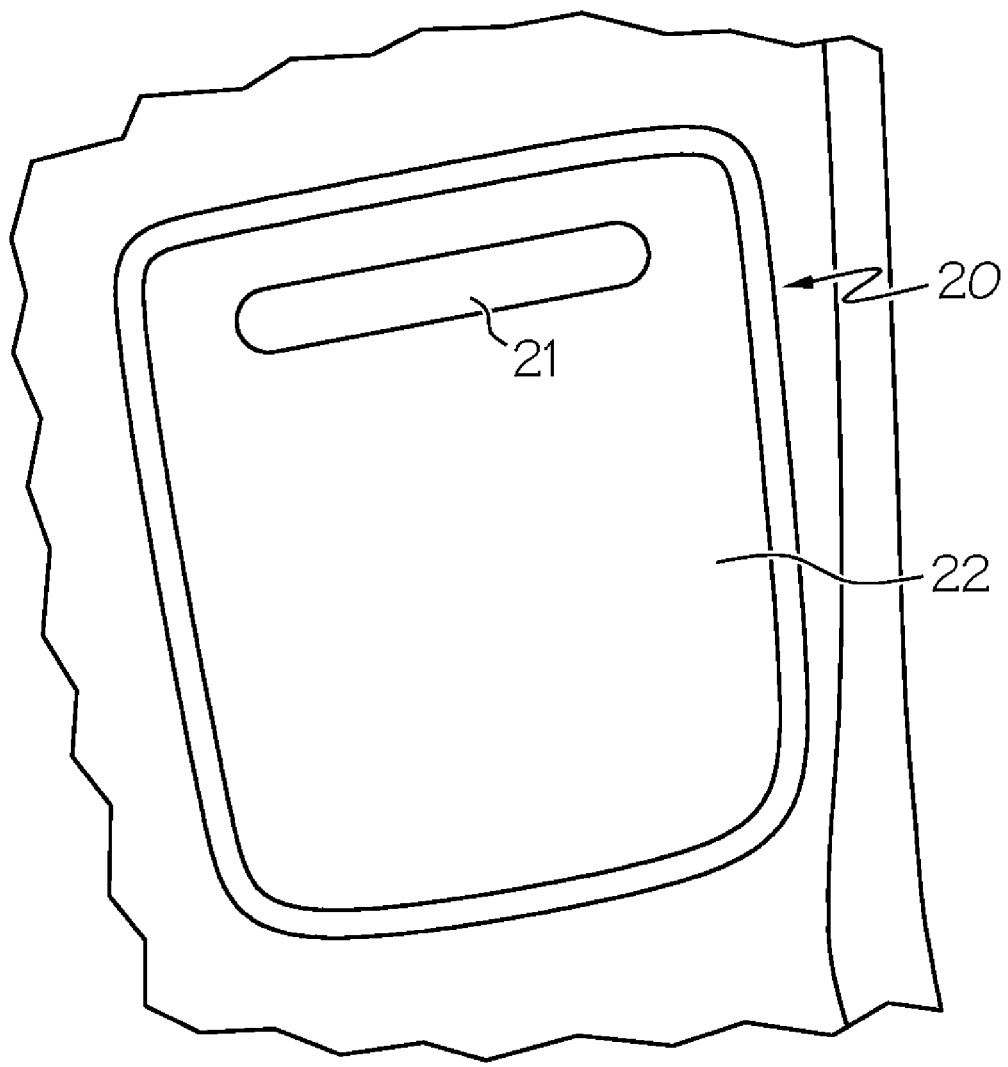
FIG. 3A is a front view of an electronic device holder in a closed position according to one or more embodiments of the present invention.
Figure 3B:
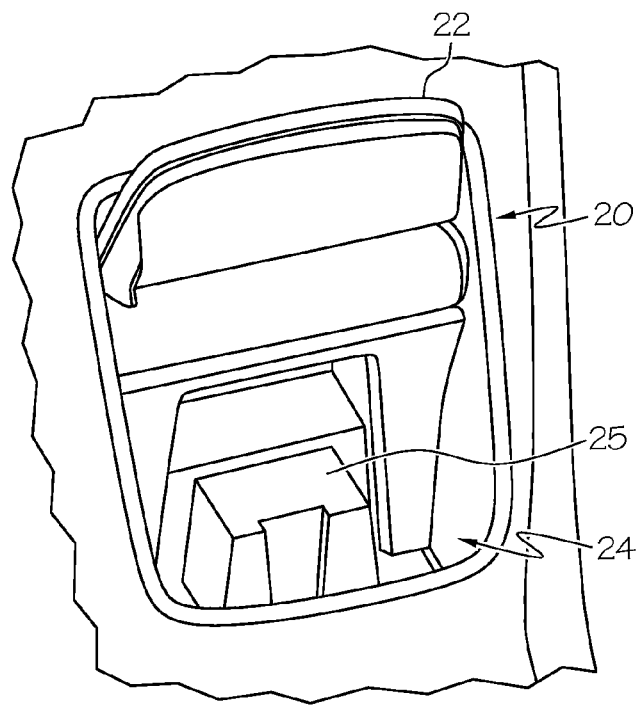
FIG. 3B is a front view of an electronic device holder in an open position according to one or more embodiments of the present invention.
Figure 3C:
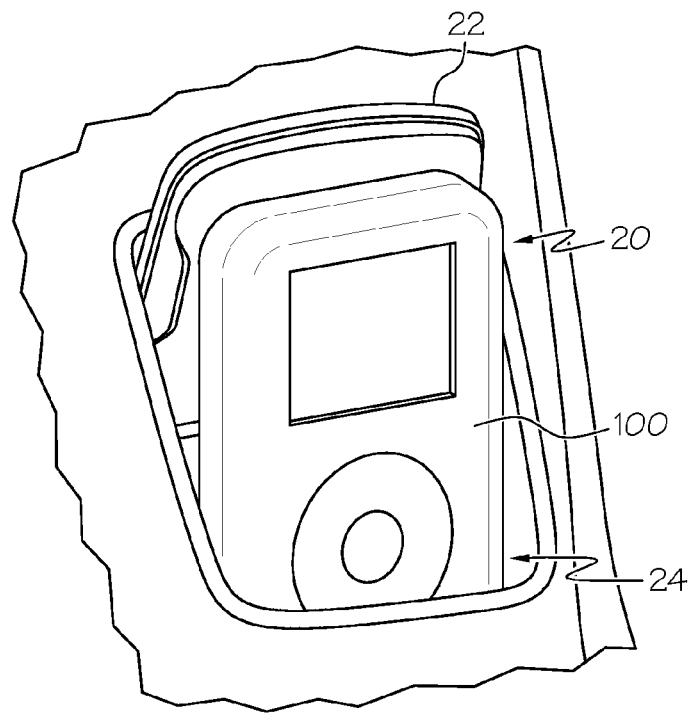
FIG. 3C is a front view of an electronic device holder comprising an electronic device disposed therein according to one or more embodiments of the present invention.

Referring again to FIG. 2, the electronic device holder 20 may also comprise a moveable door 22 disposed above the support cavity 24. Referring to FIG. 3A, the moveable door 22 covers the support cavity 24 when in a closed position. Referring to FIGS. 3B and 3C, when the door 22 is opened (e.g., by being flipped upward), the electronic device holder 20 is then operable to receive an electronic device 100. Referring to the embodiment of FIG. 3A, the moveable door 22 may comprise a disengagement button 21. The disengagement button 21 releases the locking mechanism that secures moveable door in a closed position and allows the moveable door 22 to adjust from a closed position to a partially open position. From this partially open position, the moveable door 22 may be configured to pivot of flip to a full open position. This two stage opening procedure prevents an electronic cord from being jammed when the moveable door 22 is opened or closed.

As shown in FIG. 2, the moveable door 22 is operable to accommodate electronic devices 100 of various heights. The moveable door 22 may contact an upper portion of the electronic device 100, thereby providing additional support to the electronic device 100 inside the electronic device holder 20. The moveable door 22 may comprise various components, e.g. springs, hinges, etc.

Referring to FIGS. 1 and 4A, the vehicle electronic device support system 1 may also comprise a vehicle console bin 30 comprising an auxiliary port 32. As shown, the electronic device 100 is disposed anterior to the vehicle console bin 30, such as on the dashboard 2. Referring to FIG. 1, the electronic device holder 20 and vehicle console bin 30 are joined by an opening 28 at the bottom of the electronic device holder 20 which extends into the vehicle console bin 30, such a through dash 2. Referring to FIGS. 1 and 4A, the cord 150 of an electronic device 100 (e.g., power cord, auxiliary cord or both) is passed through this opening 28 into the vehicle console bin 30 for connection with the auxiliary port 32.

The auxiliary port 32 may comprise a power source for powering the electronic device 100, and/or may comprise a port for integrating the electronic device 100 into the vehicle's electronic components. For example, inserting the cord 150 into the auxiliary port 32 may enable the music stored on the electronic device 100 to be played through the vehicle's sound system. Alternatively, an auxiliary port 32 may a power source.

It should be understood that the electronic device support system contemplated herein includes an apparatus or components (e.g., an opening) for spatial communication between the dash and the vehicle console. Accordingly, it will be understood that the locations where a vehicle dash and console begin and end are not limitations, but rather indicia for locating a forwardly (or anteriorly) placed electronic device holder and a rearwardly (or posteriorly) placed vehicle console so that spatial communication between these components exists to secure and/or hide electronic device wires running from the electronic device (e.g., held by the electronic device holder) to one or more power/auxiliary ports (e.g., held by the vehicle console).

Referring to FIG. 4B, the vehicle console 3 may also comprise a moveable upper panel 40 disposed over and configured to cover the vehicle console bin 30, as well as the cord 150 extending within the vehicle console bin 30. When the moveable upper panel 40 is covering the vehicle console bin 30, the upper panel 40 may be secured through a latching mechanism 44 as shown in the embodiment of FIG. 4B. The latching mechanism 44 may be located at the interface of the vehicle console 2 and the dashboard 3. When the upper panel 40 is removed or simply moved as shown in FIG. 4A, the vehicle console bin 30, and any items stored therein, may be accessed. Many types of motion for the upper panel 40 are contemplated herein, for example, sliding or swiveling. In further embodiments, the upper panel 40 may comprise at least one cupholder 42, at least one storage compartment 46, or combinations thereof. As shown in FIG. 2B, the electronic device 100 may be used without losing use of the cupholder 42 or storage compartments 46.

Accordingly, the driver of a vehicle having the electronic device support system described herein can retract the electronic device within the electronic device holder and close the panel to the vehicle storage bib to effectively conceal the existence of the electronic device (e.g., the electronic device and the wires are not in plain view through a vehicle window).

Figure 5:
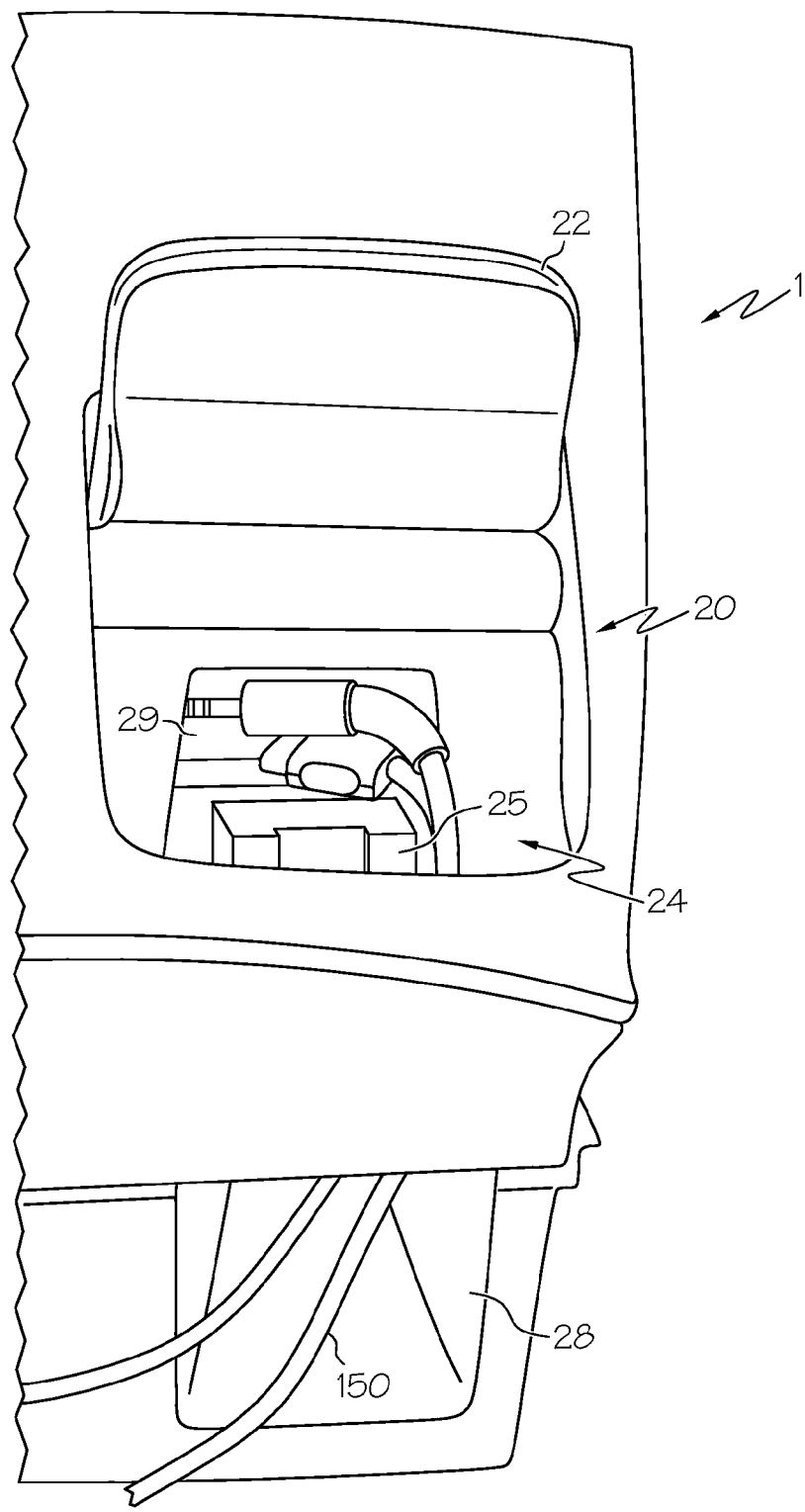
FIG. 5 is a front view of an electronic device holder comprising an electronic cord stored inside the electronic storage compartment according to one or more embodiments of the present invention.

Referring to a further embodiment as shown in FIG. 5, the vehicle electronic support system 1 comprises an electronic cord storage compartment 29 disposed above the retractable mechanism 25. The cord storage compartment 29 is configured to store an electronic cord 150. This is especially helpful when the driver removes an electronic device 100, but not the cord 150 from the vehicle electronic device support system 1. Instead of storing the cord 150 inside the vehicle console bin 30 to ensure the cord 150 is hidden, the cord 150 may be stored inside the storage compartment 29, which provides sufficient space so that the moveable door 22 may be closed, thereby hiding the cord 150.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A vehicle electronic device support system comprising:
an electronic device holder disposed anterior to a vehicle console, wherein the electronic device holder comprises:
a support cavity disposed at a lower portion of the electronic device holder, wherein the support cavity comprises a retractable mechanism having a retracted position and an extended position, wherein the retractable mechanism is configured to deflect linearly within the support cavity in a direction away from an electronic device to the retracted position upon insertion of the electronic device, the retractable mechanism being spring biased toward the extended position to engage and secure a bottom section at a face of the electronic device at a location inside the support cavity such that the retractable mechanism is located inside the support cavity in both the retracted position and the extended position; and
a moveable door configured to cover the support cavity while in a closed position, and further configured to allow insertion of an electronic device into the support cavity while in an open position;
wherein the retractable mechanism is moveable between the retracted and extended positions within the support cavity independently of the position of the moveable door, the moveable door moving between the open and closed positions independently of the position of the retractable mechanism.

2. The vehicle electronic device support system of claim 1 wherein the moveable door comprises a disengagement button configured for adjusting the moveable door from a closed position to a partially open position upon actuation.

3. The vehicle electronic device support system of claim 2 wherein the moveable door is pivotable from the partially open position to a fully open position.

4. The vehicle electronic device support system of claim 1 further comprising an electronic cord storage compartment disposed above the retractable mechanism, wherein the cord storage compartment is configured to store an electronic cord while the moveable door is in a closed position.

5. The vehicle electronic device support system of claim 1 wherein the retractable mechanism of the support cavity is operable to accommodate electronic devices of various widths, various heights, and combinations thereof.

6. The vehicle electronic device support system of claim 1 wherein the retractable mechanism comprises a spring loaded bar.

7. The vehicle electronic device support system of claim 1 wherein the support cavity comprises a bumper disposed within the support cavity such that the bumper contacts one face of an electronic device, and the retractable mechanism contacts an opposite face of the electronic device.

8. The vehicle electronic device support system of claim 7 wherein the bumper comprises rubber.

9. The vehicle electronic device support system of claim 1 wherein the moving door is operable to accommodate electronic devices of various heights.

10. The vehicle electronic device support system of claim 1 wherein the retractable door is spring loaded.

11. A vehicle electronic device support system comprising;
a vehicle console having a vehicle console bin with a manually accessible auxiliary port disposed within the vehicle console bin;
an electronic device holder disposed anterior to the vehicle console and offset along the length of the vehicle from the vehicle console bin, the electronic device holder comprising an opening at the bottom of the electronic device holder which extends into the vehicle console bin,
wherein in use, the vehicle console bin being sized to allow an operator access to a cord of an electronic device that passes through the opening between the electronic device holder and the vehicle console bin such that the operator manually connects the cord with the auxiliary port;
wherein the opening passes through a vertical wall between the vehicle console bin and the electronic device holder.

12. The vehicle electronic device support system of claim 11 further comprising a moveable upper panel disposed over and configured to cover the vehicle console bin and thereby cover a cord disposed within the vehicle console bin.

13. The vehicle electronic device support system of claim 12 wherein the upper panel comprises at least one cupholder.

14. The vehicle electronic device support system of claim 12 wherein the upper panel comprises at least storage compartment.

15. The vehicle electronic device support system of claim 12 wherein the upper panel is operable to move by swiveling or sliding.

16. A vehicle electronic device support system comprising:
a vehicle console including a vehicle console bin;
an electronic device holder disposed anterior to the vehicle console comprising
a support cavity disposed at a lower portion of the electronic device holder, wherein the support cavity comprises a retractable mechanism having a retracted position and an extended position, wherein the retractable mechanism is configured to deflect linearly within the support cavity in a direction away from an electronic device upon insertion of the electronic device, the retractable mechanism being spring biased toward the extended position to engage and secure a bottom section at a rear face of the electronic device at a location inside the support cavity such that the retractable mechanism is located inside the support cavity in both the retracted position and the extended position;

a moveable door that is moveable relative to the retractable mechanism between an open position and a closed position such that in the closed position the moveable door is configured to cover the support cavity, and is further configured to allow insertion of an electronic device into the support cavity while in the open position; and an opening between the electronic device holder which extends into the vehicle console bin, wherein the opening is configured to receive a cord of an electronic device from the electronic device holder into the vehicle console bin;

wherein the retractable mechanism is moveable between the retracted and extend positions within the support cavity independently of the position of the moveable door, the moveable door moving between the open and closed positions independently of deflection of the retractable mechanism.

17. The vehicle electronic device support system of claim 16 wherein the retractable mechanism of the support cavity is operable to accommodate electronic devices of various widths, various heights, and combinations thereof.

18. A vehicle electronic device support system of claim 16 further comprising an auxiliary port disposed within the vehicle console bin, wherein the auxiliary port is operable to be connected to the cord of the electronic device.

* * * * *